B. A. DRAYTON.
Food-Holders for Bird-Cages.

No. 206,867. Patented Aug. 13, 1878.

UNITED STATES PATENT OFFICE.

BENJAMIN A. DRAYTON, OF NEW YORK, N. Y.

IMPROVEMENT IN FOOD-HOLDERS FOR BIRD-CAGES.

Specification forming part of Letters Patent No. 206,867, dated August 13, 1878; application filed May 10, 1878.

*To all whom it may concern:*

Be it known that I, BENJ. A. DRAYTON, of the city, county, and State of New York, have invented a new and useful Improvement in a Holder for Cuttle-Bone, Fruit, &c., as applied to bird and animal cages, which improvement is fully set forth in the following specification and accompanying drawings, in which—

Figure 1:
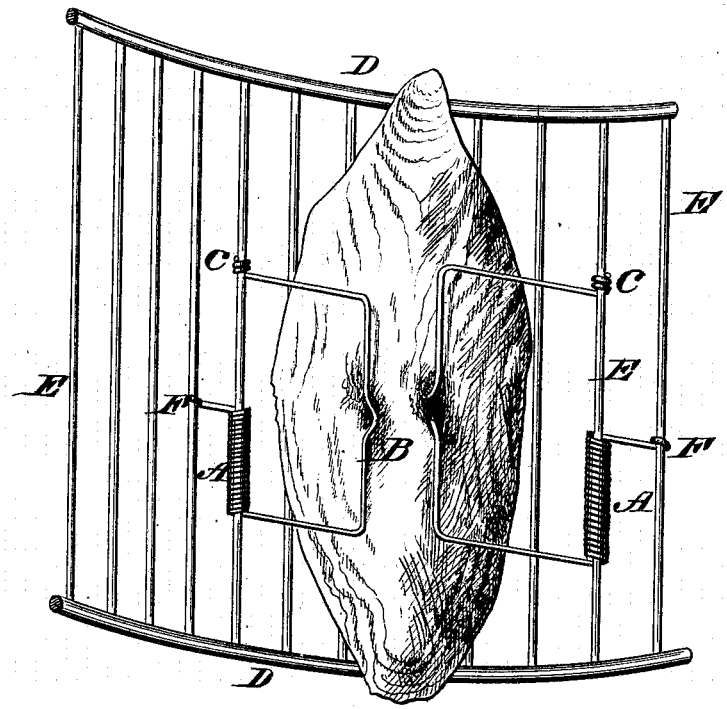
Figure 2:
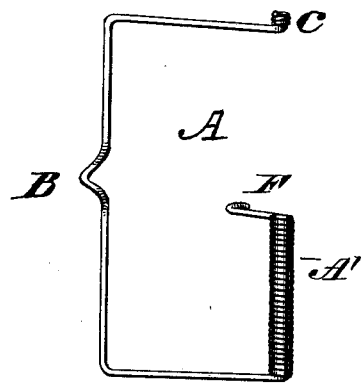

Figure 1 is a perspective view of a section of cage with my holder attached, and Fig. 2 is a view of the holder detached from the cage.

The object of my invention is to furnish as an integral part of a cage a device by which cuttle-bone, fruit, &c., can be readily adjusted, securely held in position, and easily accessible to the inmate of the cage; and the novelty consists in the combination, with a cage, of a pair of spring-holders, each being made of a single piece of wire provided with a spiral spring, and ending at one end in a holdfast and at the other end in a coil, and said holders being attached to the cage by coiling the free ends around the filling-wires, substantially in the manner as will be hereinafter more fully set forth.

In the drawings, E E E represent the upright or filling-wires of the cage, and D D the horizontal connecting or binding wires. A represents the improved spring-holder, made of a single piece of wire or other material, of the construction substantially as shown in Fig. 2 of the drawings.

A' is the spiral spring of the holder, encircling the upright wire E, and with an infolding movement toward the wires of the cage, having a holdfast at F. B is a raised point for the purpose of entering and securing the cuttle-bone or other substance, and C is a returning-coil, also encircling the upright wire E to form a fastening. These holders are arranged opposite each other on the cage, substantially in the manner as shown in Fig. 1 of the drawings, and the two constitute a pair. In some cases a holder will be sufficient to hold the cuttle-bone or other substance in position. The bent or raised portion B of the holder prevents the confined substance from vertical displacement.

It will be seen by the foregoing that the material to be held, having been punctured by the point B and released from the hand, is immediately acted upon by the coiled spring A, which, firmly pressing it against the wires of the cage, while it leaves it perfectly accessible to the bird, firmly holds it in position, and continues this unfailing pressure upon it until it is wholly consumed.

The operation of my device is not confined to any particular part of the cage, but can be adjusted to any part, and either inside or outside.

Having thus described my invention, what I claim as new, and desire to secure by Letters Patent, is—

The combination, with a cage, of a pair of spring-holders, each holder made of a single piece of wire, provided with a spiral spring, and terminating at one end in a holdfast and at the other end in a coil, and being attached to the cage by coiling the free ends around the filling-wires, substantially as shown and described.

BENJ. A. DRAYTON.

Witnesses:
ALVAN DRAYTON,
HARRY W. LAWRENCE.